(12) United States Patent
Bedrossian

(10) Patent No.: US 9,874,061 B2
(45) Date of Patent: Jan. 23, 2018

(54) TRACTOR TRACTION CONTROL FOR CASED HOLE

(71) Applicant: Halliburton Energy Services, Inc., Houston, TX (US)

(72) Inventor: Nazareth Sarkis Bedrossian, Dickinson, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 115 days.

(21) Appl. No.: 14/771,509

(22) PCT Filed: Nov. 26, 2014

(86) PCT No.: PCT/US2014/067559
§ 371 (c)(1),
(2) Date: Aug. 31, 2015

(87) PCT Pub. No.: WO2016/085484
PCT Pub. Date: Jun. 2, 2016

(65) Prior Publication Data
US 2016/0362953 A1 Dec. 15, 2016

(51) Int. Cl.
*E21B 23/00* (2006.01)
*E21B 4/18* (2006.01)
*E21B 44/02* (2006.01)
*G05B 19/042* (2006.01)
*E21B 44/00* (2006.01)
(Continued)

(52) U.S. Cl.
CPC ............... *E21B 23/00* (2013.01); *E21B 4/18* (2013.01); *E21B 44/005* (2013.01); *E21B 44/02* (2013.01); *G05B 19/0428* (2013.01); *G05B 19/19* (2013.01); *E21B 47/12* (2013.01); *E21B 2023/008* (2013.01); *G05B 2219/45129* (2013.01); *G05B 2219/50379* (2013.01)

(58) Field of Classification Search
CPC . E21B 23/00; E21B 4/18; E21B 47/12; E21B 2023/008
See application file for complete search history.

(56) References Cited

U.S. PATENT DOCUMENTS 5,184,676 A 2/1993 Graham et al.
6,162,144 A 12/2000 Haka
(Continued)

FOREIGN PATENT DOCUMENTS

WO 2014081305 A1 5/2014

OTHER PUBLICATIONS

International Search Report and Written Opinion for PCT/US2014/067559 dated Jul. 29, 2015.

*Primary Examiner* — Blake E Michener
(74) *Attorney, Agent, or Firm* — McDermott Will & Emery LLP

(57) ABSTRACT

Traction for a downhole tractor in a wellbore. A downhole propulsion system can provide a first traction module; a second traction module; and a controller configured to compare a first input parameter representing operation of the first traction module with a second input parameter representing operation of the second traction module. The controller can adjust a first output parameter of the first traction module and/or a second output parameter of the second traction module based on an input representing slip of the first traction module relative to the second traction module.

18 Claims, 5 Drawing Sheets

(51) Int. Cl.
    *G05B 19/19* (2006.01)
    *E21B 47/12* (2012.01)

(56) References Cited

U.S. PATENT DOCUMENTS

| | | | |
|---|---|---|---|
| 6,241,031 B1 * | 6/2001 | Beaufort | E21B 4/18 |
| | | | 175/51 |
| 6,273,189 B1 | 8/2001 | Gissler et al. | |
| 6,387,009 B1 | 5/2002 | Haka | |
| 6,439,325 B1 | 8/2002 | Peters et al. | |
| 6,530,432 B2 | 3/2003 | Gipson | |
| 7,143,843 B2 | 12/2006 | Doering et al. | |
| 7,185,714 B2 * | 3/2007 | Doering | E21B 23/14 |
| | | | 175/24 |
| 7,185,716 B2 | 3/2007 | Bloom et al. | |
| 7,334,642 B2 | 2/2008 | Doering et al. | |
| 7,407,020 B2 | 8/2008 | Gleitman et al. | |
| 7,854,258 B2 | 12/2010 | Sheiretov et al. | |
| 8,346,450 B2 | 1/2013 | Pohlenz et al. | |
| 8,376,907 B2 | 2/2013 | Poulin | |
| 8,905,148 B2 * | 12/2014 | Nelson | E21B 4/18 |
| | | | 166/362 |
| 2003/0173076 A1 | 9/2003 | Sheiretov et al. | |
| 2005/0145415 A1 * | 7/2005 | Doering | E21B 4/18 |
| | | | 175/24 |
| 2006/0151212 A1 | 7/2006 | Doering et al. | |
| 2006/0196694 A1 * | 9/2006 | Bloom | E21B 4/18 |
| | | | 175/51 |
| 2009/0236101 A1 | 9/2009 | Nelson et al. | |
| 2013/0068479 A1 | 3/2013 | AlDossary | |
| 2014/0174760 A1 | 6/2014 | Slocum et al. | |
| 2014/0305653 A1 | 10/2014 | Lee et al. | |

* cited by examiner

TRACTOR TRACTION CONTROL FOR CASED HOLE

BACKGROUND

In the petroleum exploration and production industries, downhole tractors can be used to convey tools and other devices into boreholes. However, downhole tractors may be used for any desired purpose. As used throughout this disclosure, the terms "tractor", "downhole tractor" and variations thereof refer to a powered device of any form, configuration and components capable of crawling or moving within a borehole. The term "borehole" and variations thereof refer to and include any underground hole, passageway, or area.

Traditionally, the movement of the tractor is enabled by friction-generated traction between one or more components associated with the tractor, referred to herein as the "traction module(s)," and a wall of the borehole. In such instances, a normal force is usually applied by the traction module against the borehole wall. For a tractor to achieve or maintain movement within a borehole, the traction module or portions thereof preferably do not slip relative to the borehole wall. The traction module can provide sufficient traction to transport itself, any conveyed tool, and/or a delivery cable into a borehole.

Any number of other factors (referred to throughout this patent as "disturbance factors") may affect the amount of traction necessary to move the tractor within the borehole in any particular situation and environment of operation. For example, when the borehole wall possesses an irregular surface, the amount of traction necessary for movement and/or the coefficient of friction may change as the borehole surface navigated by the tractor changes. Other disturbance factors that may affect the tractor's resistance to motion include changes in the inclination of the borehole, diameter of the borehole, surface of the borehole, borehole wall properties, increasing cable drag (when a cable is used), debris in the borehole and borehole fluid properties.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is generally related to borehole operations and, more particularly, to traction control and adjustment for a downhole tractor in a wellbore.

According to the present disclosure, when the amount of traction needed for a tractor to move or continue moving in a borehole changes, a normal force of traction modules associated with the tractor can be adjusted to avoid or limit excessive slippage. The normal force may also need to be adjusted when it is desired to prevent power overload or unnecessary excessive normal force. The normal force may be effectively adjusted by an operator sending commands to the tractor from the surface using existing technology. Alternatively or in combination, the normal force may be adjusted by one or more automated control systems communicatively connected to a drive unit.

According to some embodiments, the control system can adjust the normal force of one or more traction modules continuously, automatically, without human intervention, and/or on a real-time basis. According to some embodiments, the control system can optimize the traction of the traction module(s) in the borehole by adjusting or controlling the normal force. According to some embodiments, the control system can apply a normal force sufficient to prevent or reduce slippage. According to some embodiments, the control system can adjust the normal force as without operator maintenance. According to some embodiments, the control system can react to disturbance factors by adjusting the normal force on the traction module(s). According to some embodiments, the control system can maintain or cause movement of the tractor in the borehole. According to some embodiments, the control system can allow the tractor to achieve continuous motion.

According to some embodiments of the present disclosure, traction control systems can determine an occurrence of slip without reliance on certain parameters. For example, as discussed further herein, slip or relative slip can be calculated and otherwise determined without respect to the overall body velocity of the entire propulsion system. Instead, slip or relative slip can be determined based solely on operation of individual drive units, including traction modules. Determinations made in this manner eliminate a need to measure the overall body velocity of the entire propulsion system, thereby reducing onboard equipment needs and simplifying calculations performed to determine slip a relative slip.

Figure 1:
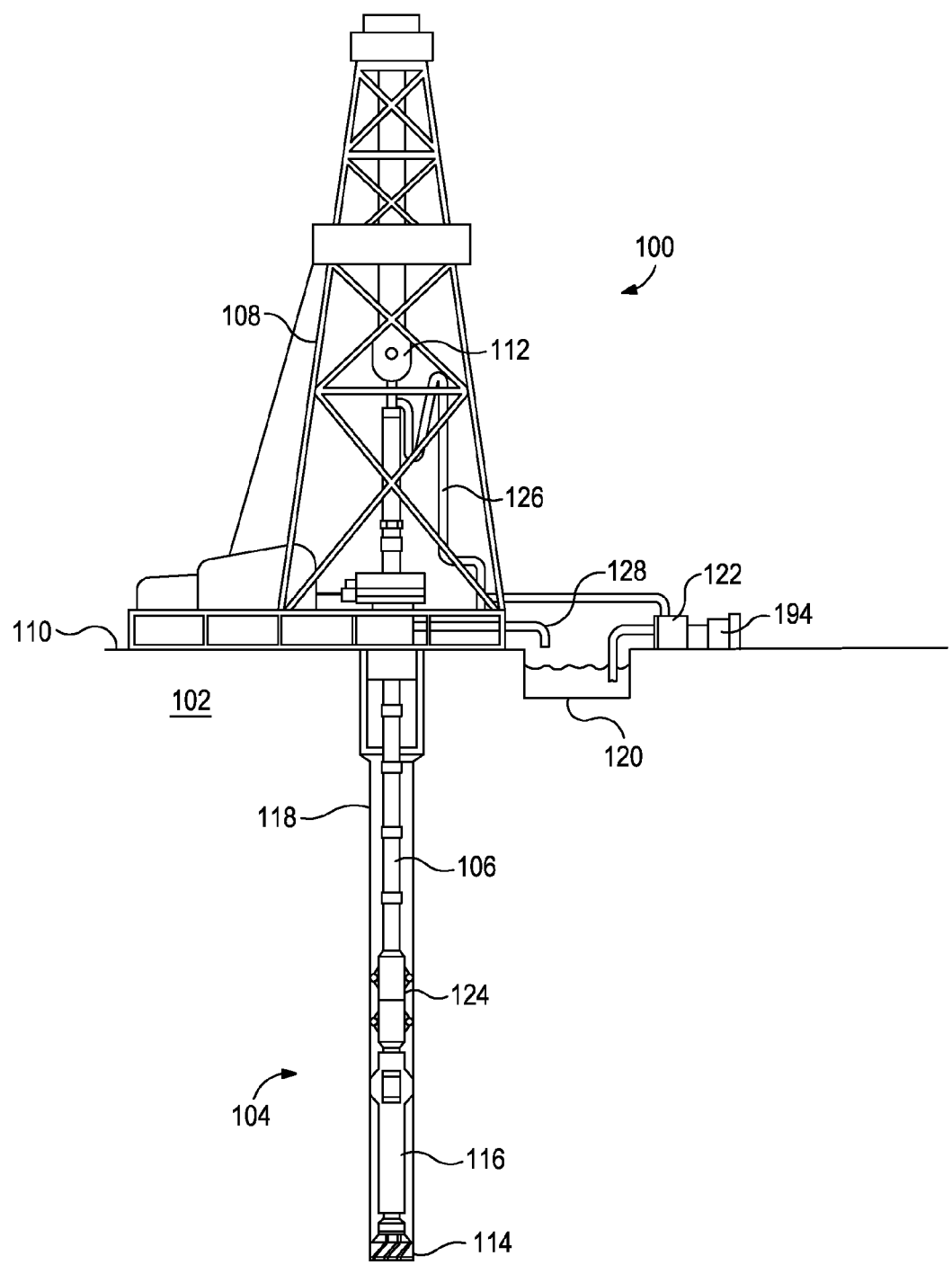
FIG. 1 shows a view of an exemplary drilling system, according to some embodiments of the present disclosure.

Referring to FIG. 1, illustrated is an exemplary drilling system 100 that may employ one or more principles of the present disclosure. Boreholes may be created by drilling into the earth 102 using the drilling system 100. The drilling system 100 may be configured to drive a bottom hole assembly (BHA) 104 positioned or otherwise arranged at the bottom of a drill string 106 extended into the earth 102 from a derrick 108 arranged at the surface 110. The derrick 108 includes a kelly 112 used to lower and raise the drill string 106.

The BHA 104 may include a drill bit 114 operatively coupled to a tool string 116 which may be moved axially within a drilled wellbore 118 as attached to the drill string 106. During operation, the drill bit 114 penetrates the earth 102 and thereby creates the wellbore 118. The BHA 104 provides directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 116, as shown in FIG. 1.

Fluid or "mud" from a mud tank 120 may be pumped downhole using a mud pump 122 powered by an adjacent power source, such as a prime mover or motor 194. The mud may be pumped from the mud tank 120, through a standpipe 126, which feeds the mud into the drill string 106 and conveys the same to the drill bit 114. The mud exits one or more nozzles arranged in the drill bit 114 and in the process cools the drill bit 114. After exiting the drill bit 114, the mud circulates back to the surface 110 via the annulus defined between the wellbore 118 and the drill string 106, and in the process, returns drill cuttings and debris to the surface. The cuttings and mud mixture are passed through a flow line 128 and are processed such that a cleaned mud is returned down hole through the standpipe 126 once again.

Although the drilling system 100 is shown and described with respect to a rotary drill system in FIG. 1, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oilrigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure. While aspects of the subject technology are described as being used in conjunction with a drill string, those skilled in the art will recognize additional applications of the subject technology. For example, the subject technology can be used with any tool string, coiled tubing, wireline, or any other downhole tool or device.

Figure 2:
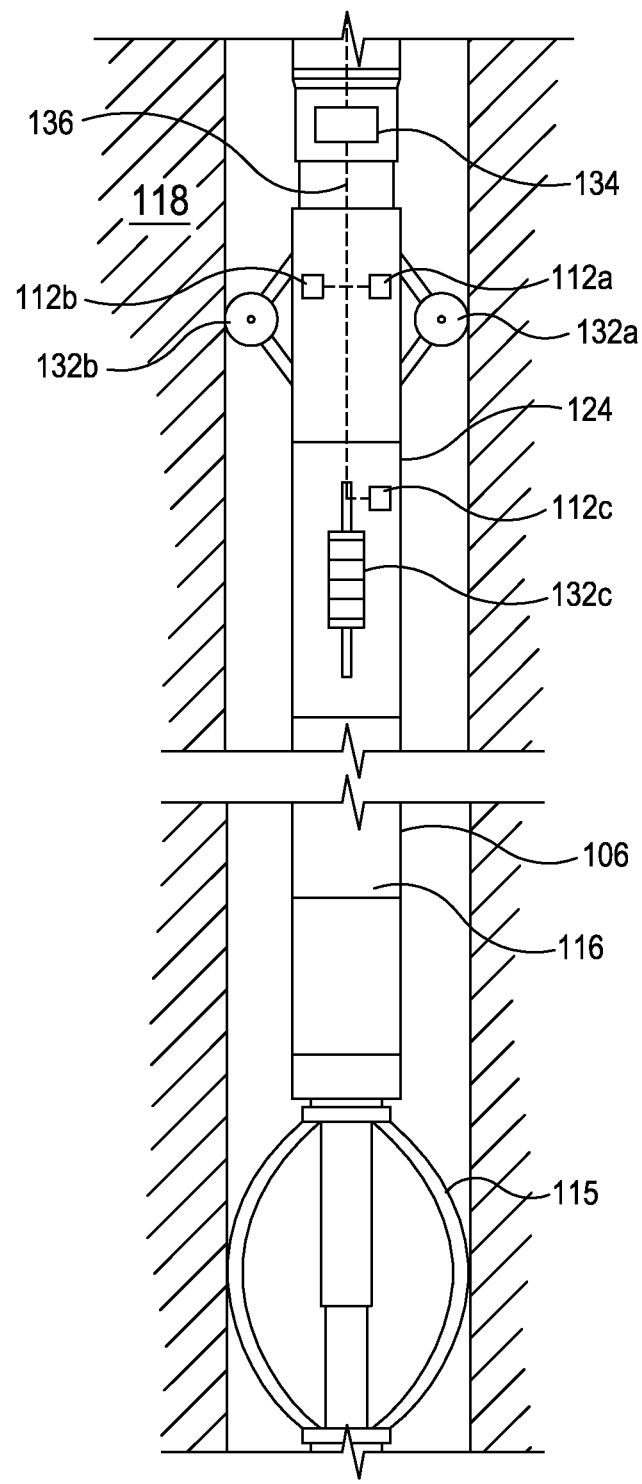
FIG. 2 shows an elevational view of an exemplary bottom hole assembly lowered into a representative wellbore, according to one or more embodiments.

FIG. 2 is an elevational view of an exemplary bottom hole assembly (BHA) 104 as lowered into a representative wellbore 118, according to one or more embodiments. As illustrated, the BHA 104 may include a tool 115. The tool 115 can include a casing inspection tool for observing the integrity of the casing or tubing to find holes, cracks, or corroded areas and fluid entry or exit points. It also detects scale or bacteria buildup, which can impede the flow of hydrocarbons out of the wellbore. The tool 115 can include a mechanism for formation evaluation, cement evaluation, mechanical services, production logging, and/or reservoir monitoring.

While not specifically illustrated, those skilled in the art will readily appreciate that the BHA 104 may further include various other types of drilling tools or components such as, but not limited to, a steering unit, one or more stabilizers, one or more mechanics and dynamics tools, one or more drill collars, one or more accelerometers, one or more jars, and one or more heavy weight drill pipe segments.

The BHA 104 may further include at least one downhole propulsion system 124, according to one or more embodiments. In some embodiments, the downhole propulsion system 124 may be characterized as a downhole tractor, or the like, as generally known to those skilled in the art. According to some embodiments, as illustrated, the propulsion system 124 may be arranged in the drill string 106, or otherwise form an integral part thereof. According to some embodiments, a second downhole propulsion system (not shown) may be arranged in the drill string 106 and configured to operate in concert with the illustrated propulsion system 124, without departing from the scope of the disclosure. The downhole propulsion system 124 may serve several purposes including, but not limited to, thrusting or propulsion of the BHA 104 in either direction within the wellbore 118, obtaining and reporting resistivity measurements of the surrounding formation 110, steering the BHA 104 towards a pay zone, and generally generating the borehole trajectory.

To accomplish appropriate weight distribution and/or balance, and now with reference to FIG. 2, the propulsion system 124 may include one or more traction modules 132 (three shown in FIG. 2 as 132a, 132b, and 132c) which may be radially expanded and/or contracted in order to strategically apply a normal force to the wall of the wellbore 118. While hidden in FIG. 2, a fourth traction module 132d is depicted in FIG. 3B. While four traction modules 132 are employed in the propulsion system 124, it should be appreciated that the propulsion system 124 may include more or less than four traction modules 132, without departing from the scope of the disclosure.

As shown in FIG. 2, traction modules 132 can be provided in pairs that are located at an axially similar location and on radially opposite sides of the tool string 116. Alternatively or in combination, as further shown in FIG. 2, more than two traction modules 132 can be provided at an axial location. The traction modules 132 can be symmetrically or asymmetrically distributed about a circumference of the tool string 116. As further shown in FIG. 2, a sets of traction modules 132 (e.g., traction module 132c and hidden traction module 132d) can be provided at a different axial location. As further shown in FIG. 2, the first set of traction modules 132 (e.g., traction modules 132a,b) can have a circumferential arrangement that is different from a circumferential arrangement of the second set of traction modules 132 (e.g., traction modules 132c,d). Moreover, the traction modules 132 may be of any type known to those skilled in the art, including, but not limited to, wheeled-type, crawler-type, mechanical-type (e.g., retractable pads), combinations thereof, and the like.

While not shown, the propulsion system 124 may further include various internal components, such as hydraulic assemblies, shafts, solenoids, pistons, and the like, designed to expand and contract the traction modules 132, but also strategically expand and contract the axial length of the propulsion system 124 itself. While a particular design for the propulsion system 124 is generally depicted and described with reference to FIG. 2, it will be appreciated that several other types and/or designs of propulsion systems 124 (e.g., downhole tractors) may be equally applicable or otherwise suitably employed in the BHA 104, without departing from the scope of the disclosure. Consequently, the propulsion system 124 is depicted and described herein for illustrative purposes only and should not be considered limiting to the disclosure.

Tools conveyed by the propulsion system 124 can be located forward of the propulsion system 124 with respect to the direction of movement of wellbore 118. The conveyed tools or other devices may be located rearward of or adjacent to the propulsion system 124, or sandwiched between different components of the propulsion system 124, or a combination thereof. Moreover, the inclusion of conveyed tools or other devices is not required.

The propulsion system 124 may further include one or more sensor units 112 (three shown as 112*a*, 112*b*, and 112*c*) coupled to or otherwise associated with corresponding traction modules 132. A fourth sensor unit (not shown) may be associated with the fourth traction module 132*d*. The propulsion system 124 may further include a bi-directional controller 134 coupled to or otherwise forming part of or being connected to the propulsion system 124. The controller 134 may be communicably coupled to each of the sensor units 112 via one or more communication lines 136 such that the controller 134 may be configured to send and receive data to/from the sensor units 112 in real time. Accordingly, the controller 134 may be provided with real time operational parameters of the propulsion system 124 during operation.

When a speed or force imbalance among the traction modules 132 is detected by one or more sensor units 112, the controller 134 may be configured to send one or more corrective action signals to the propulsion system 124 in order to remedy the inordinate imbalance. Specifically, the propulsion system 124 may be actuated in an effort to reduce slippage and bring the normal forces and/or speeds of the traction modules 132 back to within a predetermined range of suitable operation.

In some embodiments, the controller 134 may include one or more microprocessors, such as a closed feedback enabling microprocessor, or the like. The microprocessor 138 may be configured to enable the sensor units 112 to communicate with each other. For example, the first sensor unit 112*a* may be apprised of the general operating conditions of the first traction module 132*a* in real time by communicating with the controller 134.

The controller 134 may further be communicably coupled to the surface 110 (FIG. 1) via one or more communication lines 121 (FIG. 3A) such that the controller 134 may be able to send and receive data in real time to/from the surface during operation. For instance, the controller 134 may be configured to communicate to the surface various downhole operational parameter data as acquired via the sensor units 112. Once received at the surface, an operator may consider the monitored operational parameter data and, if necessary, undertake one or more corrective actions or the like in response. In some embodiments, as described in greater detail below, the one or more corrective actions may include sending one or more command signals or corrective action signals back downhole to the controller 134, which initiates action on the part of the propulsion system 124.

In other embodiments, however, the controller 134 may communicate with a computerized system (not shown) or the like configured to receive the various downhole operational parameter data as acquired through the sensor units 112. As will be appreciated, such a computerized system may be arranged either downhole or at the surface. In some embodiments, for example, the controller 134 itself may serve as the computerized system as described herein. When the downhole operational parameter data surpasses or otherwise breaches one or more predetermined limits of operation, the computerized system may be configured to alert an operator or user to the operational anomaly and, in response, one or more corrective command signals may be sent to the BHA 104 (e.g., the propulsion system 124) in order to alter the downhole operational conditions to bring the operational parameters back into a safe or efficient operating range. In other embodiments, upon recognizing or otherwise determining a breach or surpassing of the predetermined limit of operation, the computerized system may be configured to automatically send the one or more corrective action signals to the BHA 104 (e.g., the propulsion system 124), without departing from the scope of the disclosure. Accordingly, the one or more corrective actions may be fully automated, in at least one embodiment.

In yet other embodiments, however, the downhole operational parameter data received by the controller 134 as acquired through the sensor units 112 may instead be stored in an on-board memory (not shown) included in the controller 134. When stored in the on-board memory, the collected downhole operational parameter data may be converted to depth-based log so that it may be used for post analysis when the BHA 104 is returned to the surface and a technician is able to access the on-board memory and download its contents.

As will be appreciated, the communication lines 136, 121 may be any type of wired or wireless telecommunications devices or means known to those skilled in the art such as, but not limited to, electric wires or lines, fiber optic lines, downhole telemetry techniques (e.g., mud pulse, acoustic, electromagnetic frequency, etc.), combinations thereof, and the like. In some embodiments, the communication lines 136, 121 may form part of a wired drill pipe system that uses electrical wires to transmit electrical signals to and from the surface.

The propulsion system 124 can have various inputs, outputs and disturbance factors. Example inputs include energy and requested tractor speed settings. The energy may be electric or hydraulic power or any other desired, suitable form of energy capable of sufficiently powering the tractor and/or traction control system. Some example potential outputs include rotational speed of traction modules 132, normal forces provided by the traction modules 132, and associated data. Some example disturbance factors that may act upon the propulsion system 124 in the wellbore 118, influence its traction and thus hinder its ability to move effectively through the wellbore 118 are wellbore size, borehole inclination, and changes in the coefficient of friction.

Figure 3A:
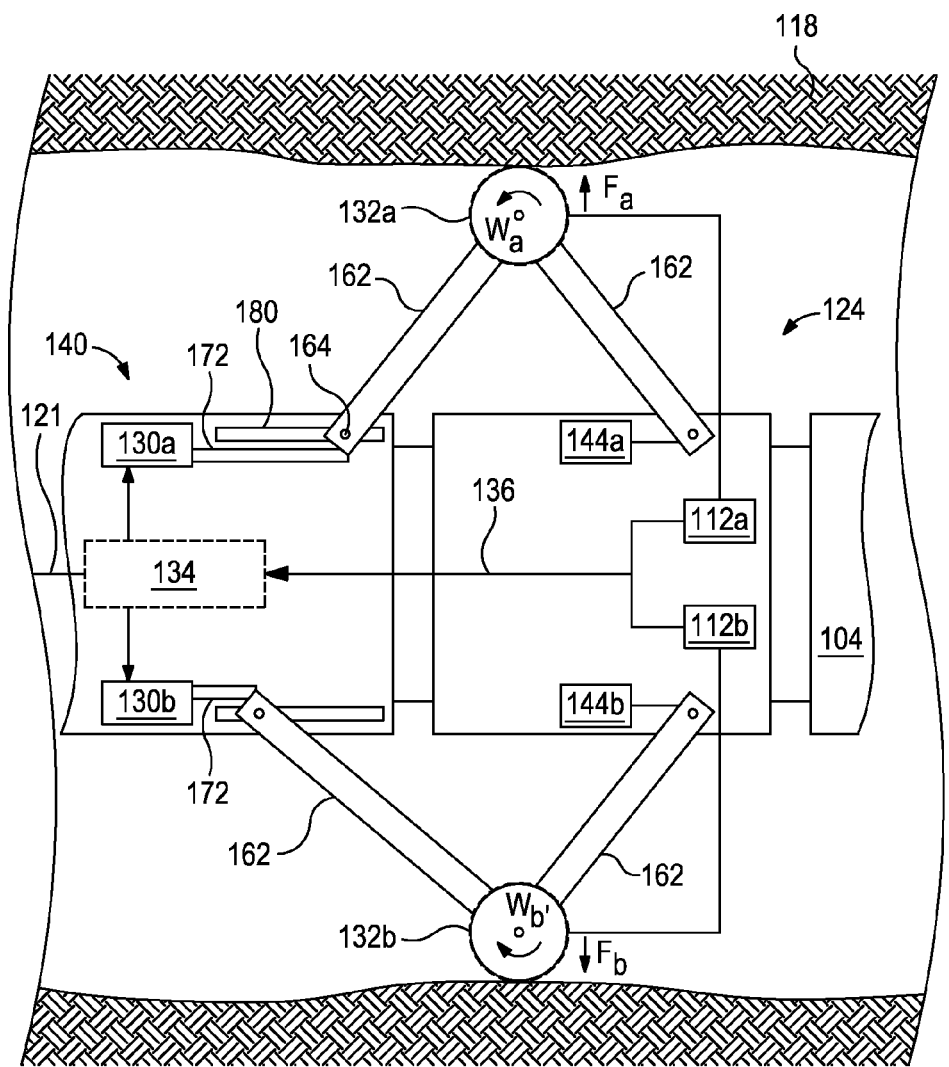
FIG. 3A shows an elevational view of an exemplary bottom hole assembly lowered into a representative wellbore, according to one or more embodiments.
Figure 3B:
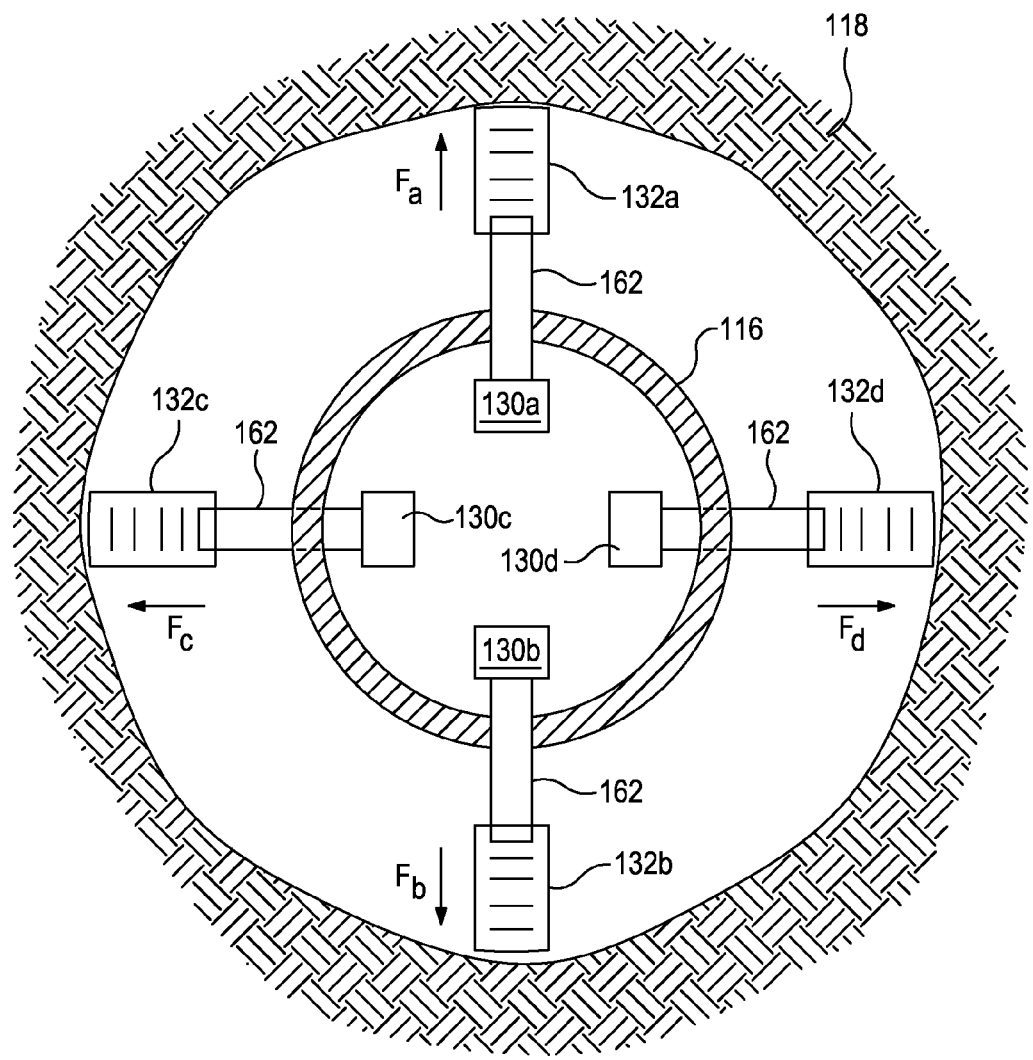
FIG. 3B shows a cross-sectional view of an exemplary bottom hole assembly lowered into a representative wellbore, according to one or more embodiments.

Referring now to FIG. 3A, a generalized representation of a propulsion system 124 is shown in partial block diagram format deployed in a borehole 118. Also shown are first and second traction modules 132*a,b*, each pressed against the wall of the borehole 118 by a normal force generator 140.

According to some embodiments, the normal force generator 140 is controlled to repeatedly determine and/or respond to slip of the corresponding traction modules 132. Whenever the slip of any traction module(s) 132 is excessive, a controller 134 causes the normal force generator 140 to increase the normal force on the corresponding traction module(s) 132 until the slip is deemed not excessive by the controller 134. Also, if desired, when the slip falls below a minimum acceptable level, the controller 134 can be designed to cause the normal force generator 140 to decrease the normal force on the traction module(s) 132 until the slip is determined by the controller 134 to be acceptable. This process continues so long as efficient tractor movement in the borehole is desired. The controller 134 of this embodiment thus controls the dynamic application of normal force to the traction module(s) 132 by the normal force generator 140. One or more force transducers can be included to provide information about the traction force of each traction module 132. This information may be used for any desired purpose, such as to assist in sharing the load among multiple drive units.

According to some embodiments, the normal force generator 140 may include drive units 144 (two shown as drive units 144a and 144b) that generate torque that is transmitted to the traction modules 132. The drive units 144 can also provide information to the controller 134 for determining load sharing, evaluating borehole conditions, or any other suitable purpose. The drive units 144 may be equipped with internal speed control mechanisms and may receive requested speed settings through the controller 134 from an operator or other source. For example, the controller 134 can provide data to the normal force generator 140 for determining the magnitude of normal force to be applied to the traction modules 132. For example, the normal force may be reduced in anticipation of an upcoming well restriction.

According to some embodiments, as shown in FIG. 3A, the downhole propulsion system 124 can include various components to detect and control operation thereof. The drive unit 144 can include a drive motor, a transmission, and/or sprocket wheels as needed to effect rotation of the traction module 132. Drive torque is transferred from the drive unit 144 to the traction module 132 against the wall of the wellbore 118 to displace the propulsion system 124 relative to the wall.

With further reference to FIG. 3A, the normal force generator 140 can include a traction actuator 130 (e.g., a first traction actuator 130a and a second traction actuator 130b). The traction actuator 130 may be mechanical, electromagnetic, hydraulic or any other suitable type. If desired, the traction actuator 130 may be equipped with a suspension element and a load-measuring device, such as a load cell. An arm 162 extends between the end 172 of the traction actuator 130 and the traction module 132. According to some embodiments, the traction actuator 130 can convert rotary motion of a motor to linear motion. The linear force generated by the traction actuator 130 is converted into the normal force that presses the traction modules 132 against the wall of the wellbore 118. This force conversion takes place at a pin or joint 164 disposed at the front end 172 of the traction actuator 130 and which is slideable within a slot 180. Thus, increasing the linear force generated by the normal force generator 140 moves the joint 164 forward in the slot 180, and thereby increases the normal force applied by the corresponding traction module 132. Likewise, the normal force will be decreased when the linear force applied to the joint 164 is decreased.

With reference to FIG. 3B, opposing pairs of traction modules 132 can influence each other with respect to normal force applied to the wellbore 118. For example, as shown in FIG. 3B, the first and second traction modules 132a,b can be circumferentially positioned at radially opposite sides (i.e., separated by 180°) of the tool string 116. Accordingly, a first normal force $F_a$ of the first traction module 132a can be equal and opposite to a second normal force $F_b$ of the second traction module 132b. Thus, an increase or decrease in the normal force of the first traction module 132a or the second traction module 132b can create a corresponding increase or decrease in the normal force of the other. Where additional traction modules 132 are used and/or where the traction modules 132 are circumferentially distributed other than at radially opposite sides of the tool string 116, an increase or decrease of a normal force on one traction module 132 can create a resultant increase or decrease of normal forces on other traction modules 132. For traction modules on the same radial side of the tool string 116, an increase in one of the normal forces may result in a decrease of the other(s). For traction modules on different radial sides of the tool string 116, an increase in one of the normal forces may result in an increase of the other(s). The resultant normal forces can be predicted and accommodated during adjustment of any of the normal forces.

With further reference to FIG. 3B, a second set of traction modules 132 (e.g., third and fourth traction modules 132c,d) can provide at least a third normal force $F_c$ and a fourth normal force $F_d$ against the wellbore 118. The third traction module 132c and/or the fourth traction module 132d can be circumferentially offset with respect to the first traction module 132a and the second traction module 132b. As shown in FIG. 3B, each of the third and fourth traction modules 132c,d can be circumferentially offset by 90° with respect to a circumferentially adjacent first traction module 132a and/or second traction module 132b. As shown in FIG. 3B, the third and fourth traction modules 132c,d can be circumferentially positioned at radially opposite sides (i.e., separated by 180°) of the tool string 116. Accordingly, a third normal force $F_c$ of the third traction module 132c can be equal and opposite to a fourth normal force $F_d$ of the fourth traction module 132d. Thus, an increase or decrease in the normal force of the third traction module 132c or the fourth traction module 132d can create a corresponding increase or decrease in the normal force of the other.

According to one or more embodiments of the disclosure, and with reference to both FIGS. 3A and 3B, the sensor units 112 (e.g., a first sensor unit 112a and a second sensor unit 112b) may be configured to monitor and report to the controller 134 the rotational speed of corresponding traction modules 132 in order to compare the rotational speeds of at least two traction modules 132. An imbalance of angular and/or linear speeds of any two or more traction modules 132 may indicate that at least some of the traction modules 132 are slipping and/or have insufficient traction against the wall of the wellbore 118.

In some embodiments, an appropriate corrective action may include adjusting a normal force applied by one or more of the tractor modules 132 on the walls of the wellbore 118. The traction actuators 130 may be communicably coupled to the controller 134 via the communication line 136. The controller 134 may be configured to send one or more corrective action signals to the traction actuators 130 in order to actuate the traction modules 132, and thereby manipulate the normal force applied by one or more traction modules 132 on the walls of the wellbore 118.

Figure 4:
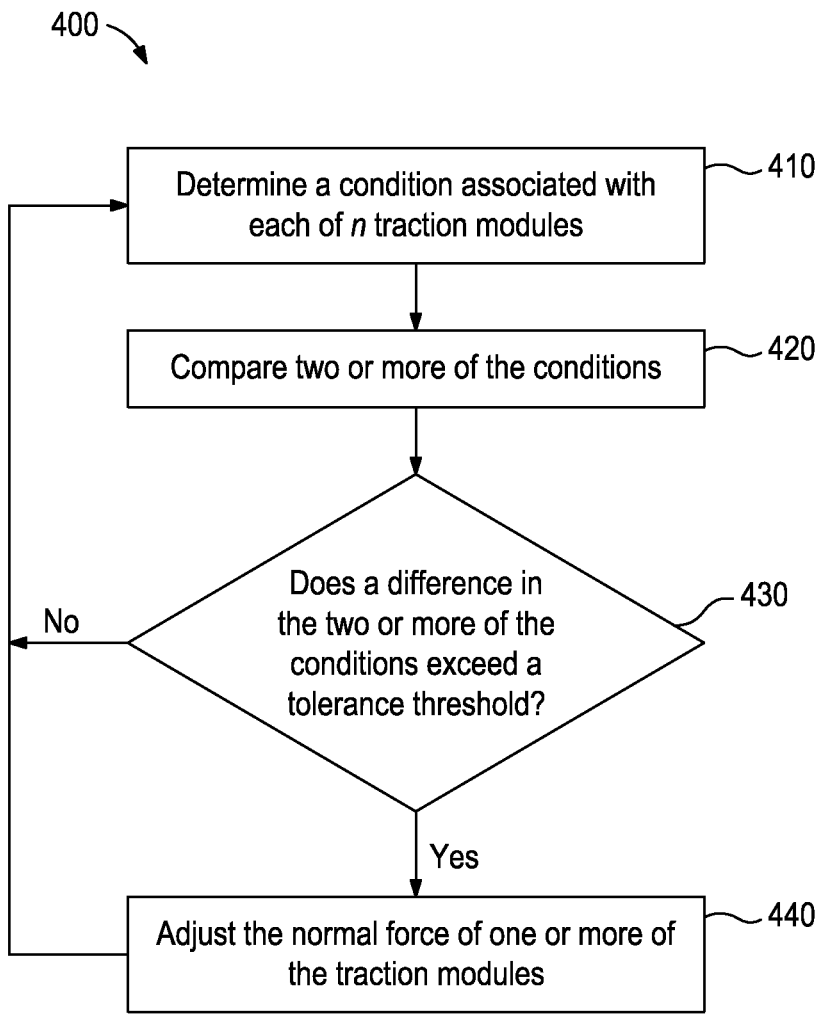
FIG. 4 shows a flow chart of an exemplary method of traction control, according to one or more embodiments.

In accordance with the present subject technology, the normal force between the traction modules 132 and the wall of the wellbore 118 can be adjusted, if necessary, as the propulsion system 124 moves through the wellbore 118 to establish or maintain traction. As shown in FIG. 4, operations of a method 400 for controlling normal force of one or more of the traction modules 132 are shown. As shown in operation 410, when the propulsion system 124 is deployed in the wellbore 118, data can be acquired. The data can represent a condition associated with one or more ("n") traction modules 132. Exemplary types of data include representations of rotational speed, $\omega$, of one or more traction modules 132 (e.g., $\omega_a$, $\omega_b$, $\omega_n$, etc.), an operating parameter of one or more drive units 144, an operating parameter of one or more traction actuators 130, and/or a normal force, F, applied by one or more traction modules 132 (e.g., $F_a$, $F_b$, $F_n$, etc.).

An occurrence of slip by one or more of the traction modules 132 can be determined based on a comparison of like conditions associated with separate traction modules 132, as shown in operation 420. According to some embodiments, a first rotational speed, $\omega_a$, of a first traction module 132a can be compared with a second rotational speed, $\omega_b$, of a second traction module 132b. As shown in operation 430, where the first rotational speed, $\omega_a$, and the second rotational speed, $\omega_b$, are equal or differ by an amount that does not exceed a tolerance threshold, the controller 134 may determine that little or no relative slip is occurring. As shown in operation 440, where the first rotational speed, $\omega_a$, and the second rotational speed, $\omega_b$, are not equal or differ by an amount that exceeds a tolerance threshold, the controller 134 may determine that relative slip is occurring and take corrective action, as described herein. In the comparison of rotational speeds, consideration may be given to disparate diameters of different traction modules 132. For example, rotational speeds can be converted to apparent linear speeds of the traction modules 132, which can then be compared as described above.

According to some embodiments, operating parameters and/or conditions of various drive units 144 can be compared to determine whether a relative slip is occurring between corresponding traction modules 132. Such parameters and conditions can include torque generated by a drive unit 144, current drawn by a drive unit 144, and/or an operating voltage of a drive unit 144. Because each traction module 132 can be driven by a separate drive unit 144, operating parameters of the drive units 144 can represent conditions (e.g., slip) associated with corresponding traction modules 132.

According to some embodiments, a parameter (torque, current, and/or voltage), $i_a$, of a first drive unit 144a can be compared with a second parameter, $i_b$, of a second drive unit 144b. Where the first parameter, $i_a$, and the second parameter, $i_b$, are equal or differ by an amount that does not exceed a tolerance threshold, the controller 134 may determine that little or no relative slip is occurring. Where the first parameter, $i_a$, and the second parameter, $i_b$, are not equal or differ by an amount that exceeds a tolerance threshold, the controller 134 may determine that relative slip is occurring and take corrective action, as described herein.

By further example, a first condition of a first traction module 132a can be compared with conditions of a plurality of other traction modules 132. A condition forming a basis of comparison can be a mean or median value of conditions for other traction modules 132.

According to some embodiments, each target normal force applied to a plurality of traction modules 132 by a corresponding normal force generator 140 can be determined as a function of rotational speeds of corresponding traction modules 132. For example, target normal forces ($F_{N1}$, $F_{N2}$, $F_{N3}$, $F_{N4}$) applied to each of four traction modules can be expressed as:

$$\begin{bmatrix} F_{N1} \\ F_{N2} \\ F_{N3} \\ F_{N4} \end{bmatrix} = [K_{4 \times 6}] \begin{bmatrix} \Delta\omega_{12} \\ \Delta\omega_{13} \\ \Delta\omega_{14} \\ \Delta\omega_{23} \\ \Delta\omega_{24} \\ \Delta\omega_{34} \end{bmatrix}$$

where $\Delta\omega_{12}$, $\Delta\omega_{13}$, $\Delta\omega_{14}$, $\Delta\omega_{23}$, $\Delta\omega_{24}$, and $\Delta\omega_{34}$ each represents a difference of rotational speeds between the indicated pair of tractor modules 132.

According to some embodiments, each target normal force applied to a plurality of traction modules 132 by a corresponding normal force generator 140 can be determined as a function of drive unit parameters (e.g., current, voltage) of corresponding drive units 144. For example, target normal forces ($F_{N1}$, $F_{N2}$, $F_{N3}$, $F_{N4}$) applied to each of four traction modules can be expressed as:

$$\begin{bmatrix} F_{N1} \\ F_{N2} \\ F_{N3} \\ F_{N4} \end{bmatrix} = [K_{4 \times 6}] \begin{bmatrix} \Delta i_{12} \\ \Delta i_{13} \\ \Delta i_{14} \\ \Delta i_{23} \\ \Delta i_{24} \\ \Delta i_{34} \end{bmatrix}$$

where $\Delta i_{12}$, $\Delta i_{13}$, $\Delta i_{14}$, $\Delta i_{23}$, $\Delta i_{24}$, and $\Delta i_{34}$ each represents a difference of drive unit parameters (e.g., current, voltage) between the indicated pair of drive units 144.

The above method can be repeated on a continuing basis and the normal force applied to the traction modules can be automatically increased each time excessive relative slip is found. If desired, this methodology may be repeated on a "real-time" basis. As used herein and in the appended claims, the term "real-time" and variations thereof means actual real-time, nearly real-time or frequently. As used herein and in the appended claims, the term "automatic" and variations thereof means the capability of accomplishing the relevant task(s) without human involvement or intervention. The frequency of repetition of this process may be set, or varied, as is desired. For example, the frequency of repetition may be established or changed based upon the particular borehole conditions or type, or one or more disturbance factor.

In some embodiments, if desired, the normal force may instead (or in addition thereto) be adjusted in an effort to optimize energy usage, prevent excessive increases of the normal force(s), maintain a constant tractor velocity, or for any other desired reason. Any suitable control, communication, measuring and drive components and techniques may be used with any type of downhole tractor to perform the traction control methodology of the present subject technology.

Those skilled in the art will readily appreciate the several different configurations that the traction modules 132 may assume to correct for forces and/or speeds. According to some embodiments, via communication with the controller 134, an operator at the surface may be able to control such configurations (i.e., sending one or more corrective action signals or commands) and the first and second sensor units 112a,b may provide real time monitoring of such actions. According to some embodiments, the computerized system, as described above, may be configured to receive the various downhole operational parameter data as acquired through the sensor units 112 and, upon recognizing a breach of a predetermined limit of suitable operation, may be configured to automatically send the one or more corrective action signals to the BHA 104 (FIG. 1) and/or the propulsion system 124, without departing from the scope of the disclosure.

Embodiments disclosed herein include:

A. A downhole propulsion system, including: a first traction module; a second traction module; and a controller configured to compare a first input parameter representing operation of the first traction module with a second input parameter representing operation of the second traction module; wherein the controller is further configured to adjust a first normal force of the first traction module and/or a second normal force of the second traction module when the first input parameter is different in quality from the second input parameter.

B. A tool string, including: a first assembly, including a first traction module; a first assembly, including a second traction module; at least one downhole tool; and a controller configured to compare a first input parameter representing operation of the first traction module with a second input parameter representing operation of the second traction module; wherein the controller is further configured to adjust a first normal force of the first traction module and/or a second normal force of the second traction module based on an input representing slip of the first traction module relative to the second traction module.

C. A method, including: comparing a first input parameter representing operation of a first traction module with a second input parameter representing operation of a second traction module; and if a difference between the first input parameter and the second input parameter exceeds a threshold, adjusting a first normal force of the first traction module and/or a second normal force of the second traction module.

Each of embodiments A, B, and C may have one or more of the following additional elements in any combination: Element 1: the first input parameter represents a first rotational speed of the first traction module and the second input parameter represents a second rotational speed of the second traction module. Element 2: a first normal force generator configured to generate the first normal force from a surface to the first traction module. Element 3: a second normal force generator configured to generate the second normal force from the surface to the second traction module. Element 4: a first drive unit configured to apply a first torque to the first traction module. Element 5: a second drive unit configured to apply a second torque to the second traction module. Element 6: the first input parameter represents current drawn by the first drive unit and wherein the second input parameter represents current drawn by the second drive unit. Element 7: the first normal force is equal and opposite to the second normal force. Element 8: the adjusting includes: by a first normal force generator, generating the first normal force from a surface to the first traction module. Element 9: the adjusting includes: by a second normal force generator, generating the second normal force from the surface to the second traction module. Element 10: by a first drive unit, applying a first torque to the first traction module. Element 11: by a second drive unit, applying a second torque to the second traction module.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A downhole propulsion system, comprising:
   a first traction module;
   a second traction module; and
   a controller that compares a first input parameter representing operation of the first traction module with a second input parameter representing operation of the second traction module and determines when a difference between the first input parameter and the second input parameter exceeds a predetermined threshold,
   wherein the first and second input parameters are independent of vehicle body velocity, and
   wherein the controller adjusts at least one of a first normal force of the first traction module and a second normal force of the second traction module when the predetermined threshold is exceeded.

2. The downhole propulsion system of claim 1, wherein the first input parameter comprises a rotational speed of the first traction module and the second input parameter comprises a rotational speed of the second traction module.

3. The downhole propulsion system of claim 1, further comprising
   a first normal force generator that generates the first normal force from a surface in contact with and to the first traction module;
   a second normal force generator that generates the second normal force from the surface to the second traction module.

4. The downhole propulsion system of claim 1, further comprising:
    a first drive unit that applies a first torque to the first traction module;
    a second drive unit that applies a second torque to the second traction module.

5. The downhole propulsion system of claim 4, wherein the first input parameter comprises current drawn by the first drive unit and the second input parameter comprises current drawn by the second drive unit.

6. The downhole propulsion system of claim 4, wherein the first normal force is equal and opposite of the second normal force.

7. A tool string, comprising:
    a first assembly including a first traction module;
    a second assembly including a second traction module and axially offset from the first traction module;
    at least one downhole tool; and
    a controller that compares a first input parameter representing operation of the first traction module with a second input parameter representing operation of the second traction module and determines when a difference between the first input parameter and the second input parameter exceeds a predetermined threshold,
    wherein the first and second input parameters are independent of vehicle body velocity and,
    wherein the controller adjusts at least one of a first normal force of the first traction module and a second normal force of the second traction module when the predetermined threshold is exceeded.

8. The tool string of claim 7, wherein the first input parameter comprises a rotational speed of the first traction module and the second input parameter comprises a rotational speed of the second traction module.

9. The tool string of claim 7, further comprising
    a first normal force generator that generates the first normal force from a surface in contact with and to the first traction module;
    a second normal force generator that generates the second normal force from the surface to the second traction module.

10. The tool string of claim 7, further comprising:
    a first drive unit that applies a first torque to the first traction module;
    a second drive unit that applies a second torque to the second traction module.

11. The tool string of claim 10, wherein the first input parameter comprises current drawn by the first drive unit and the second input parameter comprises current drawn by the second drive unit.

12. The tool string of claim 10, wherein the first normal force is equal and opposite to the second normal force.

13. A method, comprising:
    comparing a first input parameter representing operation of a first traction module with a second input parameter representing operation of a second traction module, the first and second input parameters being independent of vehicle body velocity, and;
    determining whether a difference between the first input parameter and the second input parameter exceeds a predetermined threshold; and
    when the predetermined threshold is exceeded, adjusting at least one of a first normal force of the first traction module and a second normal force of the second traction module.

14. The method of claim 13, wherein the first input parameter represents a first rotational speed of the first traction module and the second input parameter represents a second rotational speed of the second traction module.

15. The method of claim 13, wherein the adjusting comprises:
    by a first normal force generator, generating the first normal force from a surface in contact with and to the first traction module; and
    by a second normal force generator, generating the second normal force from the surface to the second traction module.

16. The method of claim 13, further comprising:
    applying a first torque to the first traction module with a first drive unit; and
    applying a second torque to the second traction module with a second drive unit.

17. The method of claim 16, wherein the first input parameter comprises a rotational speed of the first traction module and the second input parameter comprises a rotational speed of the second traction module.

18. The method of claim 16, wherein the first normal force is equal and opposite of the second normal force.

* * * * *